March 23, 1943.  B. JONES, JR., ET AL  2,314,791
PORTABLE STOVE
Filed Dec. 2, 1940  3 Sheets-Sheet 1

Inventors
Bolling Jones, Jr., R. H. White
Lynt White
By Kimmel & Crowell
Attorneys

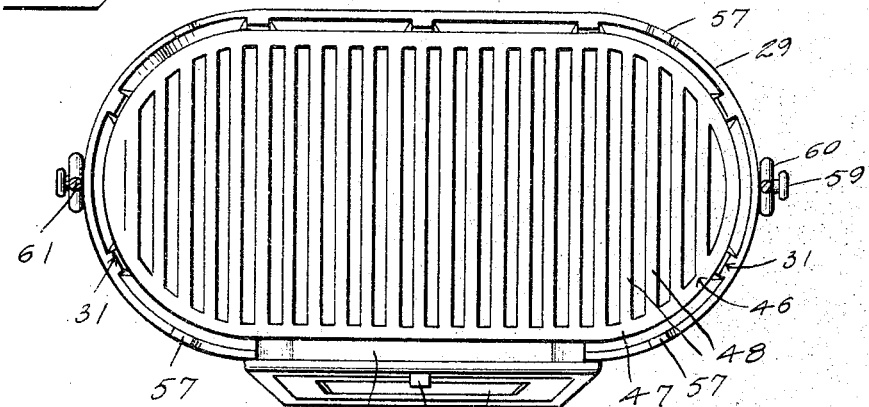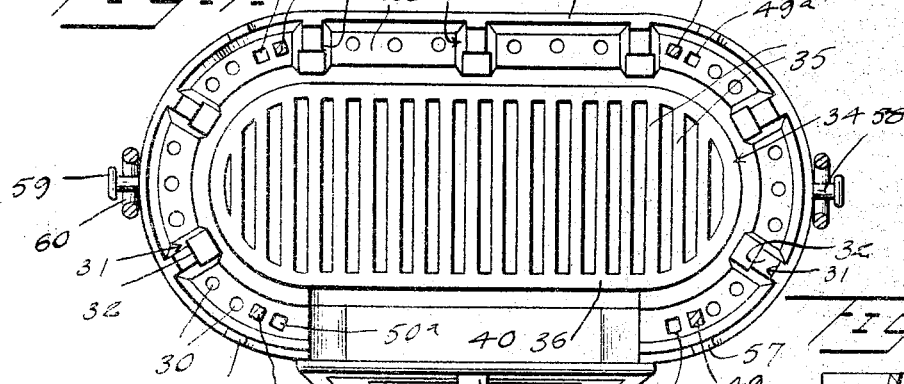

March 23, 1943.  B. JONES, JR., ET AL  2,314,791
PORTABLE STOVE
Filed Dec. 2, 1940    3 Sheets-Sheet 3
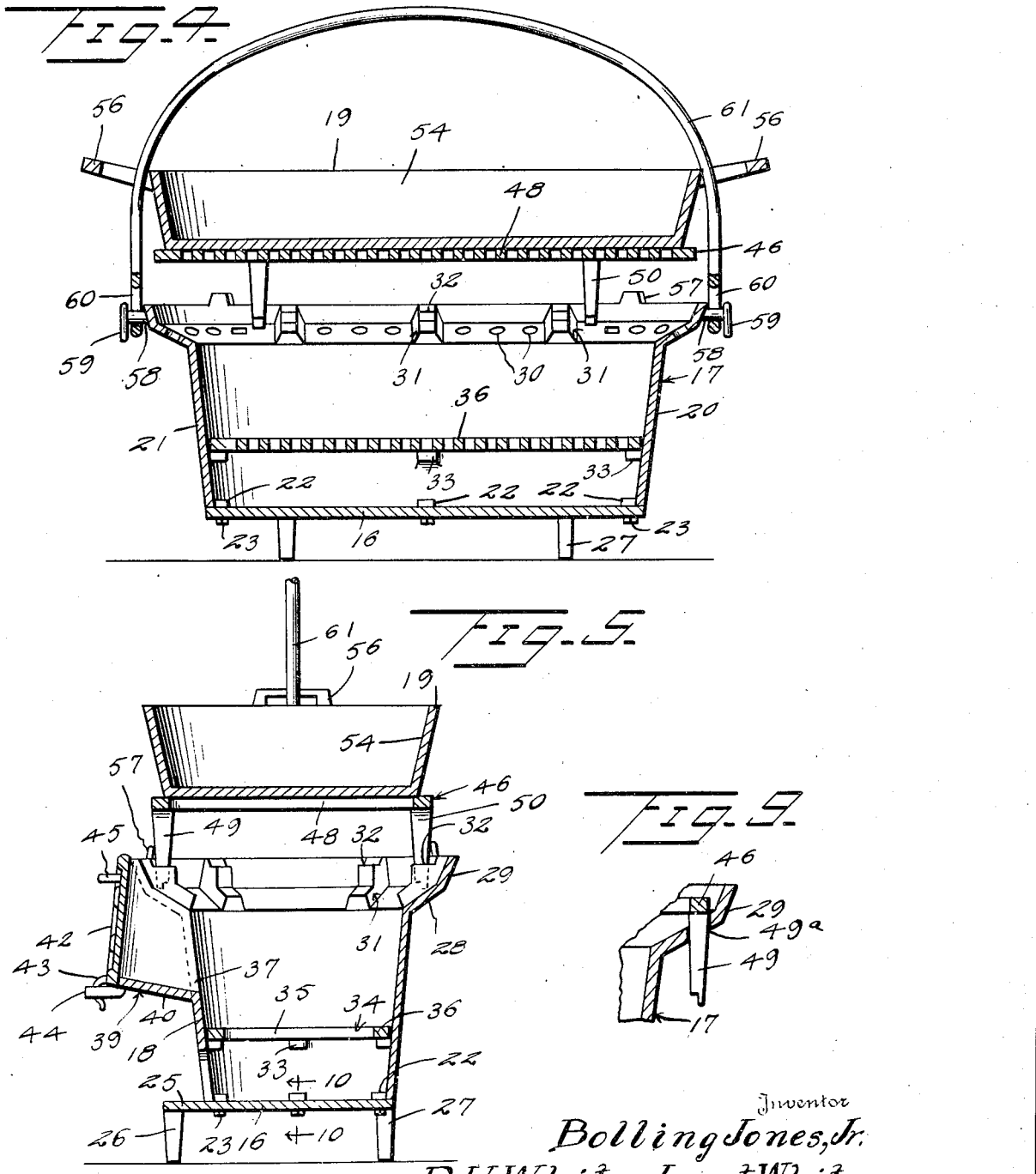
Inventor
Bolling Jones, Jr.
R.H. White, Lynt White
By Kimmel & Crowell Attorneys Patented Mar. 23, 1943

2,314,791

UNITED STATES PATENT OFFICE 2,314,791

PORTABLE STOVE

Bolling Jones, Jr., Robert H. White, and Lynt White, Atlanta, Ga., assignors to Atlanta Stove Works, Atlanta, Ga.

Application December 2, 1940, Serial No. 368,272

3 Claims. (Cl. 126—1)

This invention relates to portable stoves.

An object of this invention is to provide a portable stove which is so constructed that it may burn any desired kind of fuel, and which is so constructed that it is capable of being made in a number of different sizes for cooking of various articles.

Another object of this invention is to provide a stove of this kind which is formed with a base or burner structure embodying a fire box and an ash pit or receiver and a grill or grating disposed above the fire box or combustion chamber, the grill being so constructed that it may be inverted so as to position the grill at a point spaced upwardly from the top of the burner or fire box.

A further object of this invention is to provide a stove of this kind which includes a pan having a length substantially equal to the length of the top of the stove and which may also be coupled with the carrying handle so that the several parts of the device will be held together while the stove is being carried about.

A still further object of this invention is to provide a stove of this kind which can be manufactured at a relatively small cost so that the device can be sold to purchasers at a proportionately small cost, the device being so constructed that it may be substantially entirely cast out of suitable metal which will not readily warp under heat.

To the foregoing objects and to others which may hereinafter appear, the invention consists of the novel construction, combination and arrangement of parts as will be more specifically referred to and illustrated in the accompanying drawings wherein are shown embodiments of the invention, but it is to be understood that changes, variations and modifications may be resorted to which fall within the scope of the invention as claimed.

In the drawings:

Figure 2 is a detail end elevation partly broken away of the stove.

Figure 4 is a longitudinal section taken vertically through the device.

Figure 5 is a transverse section taken substantially through the center of the device.

Figure 6 is a sectional view taken on the line 6—6 of Figure 1.

Figure 7 is a sectional view taken on the line 7—7 of Figure 1.

Figure 9 is an enlarged fragmentary sectional view of a portion of the grate in collapsed position.

Figure 11 is a fragmentary sectional view similar to Figure 9 but showing the grate or grill in inverted position for supporting a pan above the burner.

Figure 1:
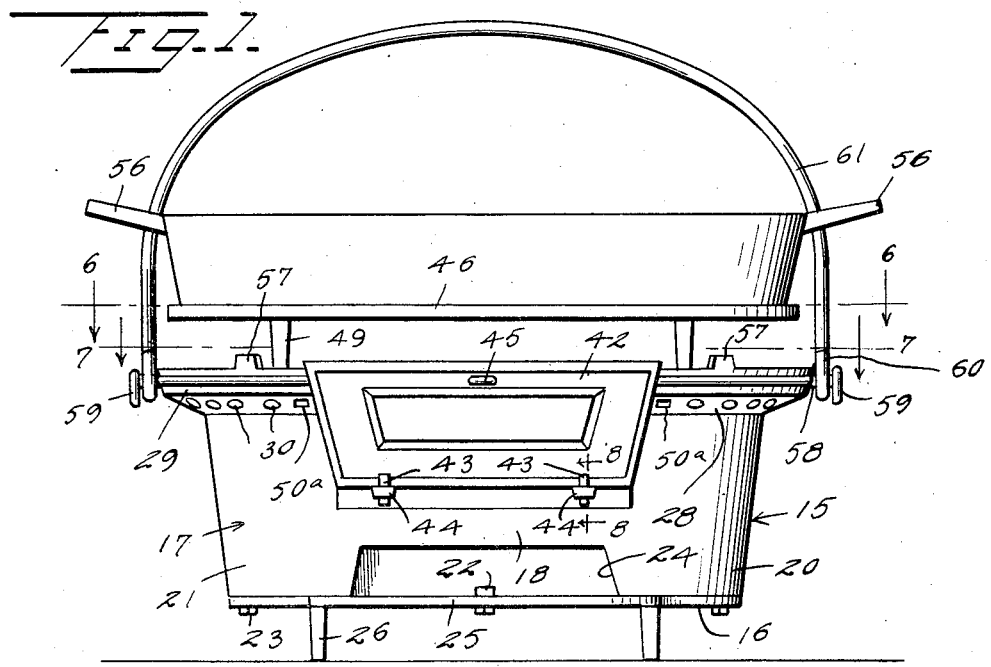
Figure 1 is a detail front elevation of a portable stove constructed according to an embodiment of this invention.

Referring to the drawings, the numeral 15 designates generally a stove or burner body which includes a bottom wall or plate 16 and an upwardly flared burner body 17. The burner body 17 is formed of substantially straight front and rear walls 18 and 19 which are connected together at the opposite ends thereof by means of arcuate or semi-circular end walls 20 and 21. The end walls 20 and 21 are formed integral with the front and rear walls 18 and 19, respectively, and form a substantially elliptical burner body. The body 17 at the lower edge thereof is formed with a plurality of inwardly projecting ears or lugs 22 and bolts or fastening devices 23 are adapted to be extended through the bottom wall 16 and to be threaded into the lugs or ears 22 so as to tightly hold the bottom wall 16 against the lower edge of the body 17.

The front wall 18 is formed with a trapezoidal draft opening 24 which extends upwardly from the lower edge of the body 17 and extending forwardly from the opening 24 a bottom wall extension 25 is formed integral with the bottom wall 16 and provides a ledge forwardly from the front wall 18. A pair of front legs 26 are carried by the opposite ends of the bottom extension 25 and a pair of rear legs 27 are formed integral with the rear edge portion of the bottom wall 16. By securing the front legs 26 to the bottom extension 25, a greater space is provided between the front and rear legs so as to provide a more firm foundation for the upwardly flared substantially elliptical burner body 17.

The body 17 at its upper edge is formed with an outwardly flared rim or flange 28 and a second upwardly and outwardly flared flange 29 is formed integral with the upper edge of the flange 28 and is disposed at an obtuse angle to the flange 28. The flange 28 extends upwardly from the body 17 at an obtuse angle to the outer face of the body 17 so that the body 17 will be formed with a substantially wide and long top rim upon which different articles to be cooked may be placed. The flange 28 is formed with a plurality of air intake openings 30 which are spaced about the flange 28 and provide a means whereby air may enter the upper portion of the body 17 for combustion purposes. The two flanges 28 and 29 are each provided with a plurality of spaced apart substantially L-shaped lugs 31 which are provided at their upper ends with a ledge or seat 32 spaced downwardly from the upper edge of the upper flange 29.

The ledge or seat 32 is spaced inwardly and downwardly from the upper edge of the flange 29 so that if desired the grate or grill, to be hereinafter described may be seated directly on the ledge 32.

The body 17 on the interior thereof and at a point upwardly from the lower end is provided with a plurality of inwardly extending lugs or ears 33 which form supporting means for supporting a grate 34. The grate 34 has a substantially elliptical configuration and is provided with a plurality of parallel grate bars 35 which are secured to a substantially elliptical frame or rim 36. The grate 34 is removably positioned on the supporting lugs 33 so that the grate may readily be removed for cleaning or other purposes.

Figures 8, 10:
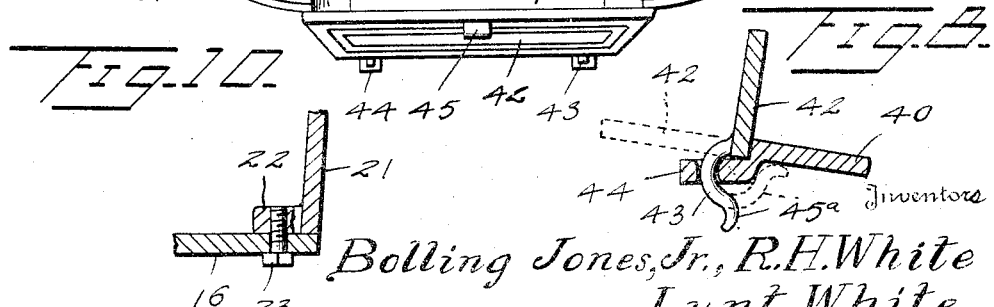
Figure 8 is an enlarged fragmentary sectional view taken on the line 8—8 of Figure 1.
Figure 10 is a fragmentary sectional view taken on the line 10—10 of Figure 5.

The front wall 18 is formed with an opening 37 and a feed door frame structure 39 is secured to the front wall 18 about the edges of the opening 37 and extends forwardly and upwardly from the bottom edge of the opening 37. The frame structure 39 includes a bottom wall 40 and a pair of upwardly flared side walls 41 which are formed integral with the bottom wall 40 and also with the front wall 18. An inverted truncated triangular door 42 is adapted to engage the forward edge of the frame 39 and the door 42 is provided at its lower edge with a pair of arcuate hinge members 43 which engage through a pair of apertured forwardly projecting ears or lugs 44 which are carried by the bottom wall 40. A handle 45 is carried by the upper edge of the door 42. As shown in Figure 8, the door 42 may be swung downwardly to the dotted line position in Figure 8 where the hinge members 43 will support the door 42 in a position substantially in alignment with the bottom wall 40. In this open position, the lower reversely curved ends 45ª of the hinge members 42 are adapted to engage the bottom wall 40 and provide a stop means for limiting the downward swinging of the door 42.

A grill generally designated as 46 is adapted to engage the top of the burner or body 17 and comprises a substantially elliptical frame 47 and a plurality of parallel spaced apart grate bars 48 which are fixed at their opposite ends to the frame 47. A pair of front legs 49 are secured to the frame 47 and a pair of rear legs 50 are also secured to the frame 47. The front legs 49 are preferably spaced apart a slightly greater distance than the rear legs 50 so that the grill 46 may either be positioned with the frame 47 spaced upwardly from the flange 29 or if desired, the grill 46 may be positioned with the frame 47 resting on the lugs 32.

Where the grill 46 is resting on the lugs or seat 32, the legs 49 are adapted to be extended through openings 49ª and the legs 50 are adapted to be extended through openings 50ª, which are formed in the flange 28. The legs 49 and 50 are thus adapted to be positioned in depending relation with respect to the flange 28 as shown in Figure 9. However, the legs 49 and 50 are each formed with a recessed portion or rabbet 51 in their lower ends, which provide a seat on which a pan or receptacle 52 is adapted to removably engage.

The pan or receptacle 52 includes a bottom wall 53 and an upstanding side wall 54 which is formed with semi-circular end walls 55. A pair of U-shaped handles 56 are secured to the upper portions of the end walls 55 and provide a means whereby the pan or receptacle 52 may be readily handled. The pan or receptacle 52 is of such a size that if desired, the grill 46 may be removed from the lugs 31 and the bottom 53 of the pan supported on the seats 32. The flange 29 on its upper edge is formed with a plurality of upstanding lugs 57 which are adapted to hold the grill 46 against lateral shifting when the frame 47 rests on the lugs 31.

The flanges 29 at the opposite ends thereof are provided with a pair of outstanding pins 58 which have a flanged head 59 on their outer ends, and a loop 60 formed in the opposite ends of a bail 61 is adapted to engage over the head or flange 59 and thereby position loosely about the pins 58. The heads 59 are of a construction such that the major portion of each head 59 projects downwardly below the pan 58 so that the loops or eyes 60 cannot slip off of the pins 58.

In the use and operation of this device, the fuel is adapted to be placed on the grate 34, this fuel being either wood, charcoal, coal or the like, and the opening 24 below the grate 34 will provide a draft opening through which air may pass for forming the desired draft and combustion of the fuel. The fuel may be placed on the grate 34 by opening the door 42. The grill 46 may be positioned as shown in Figures 1, 4 and 5 with the legs 49 positioned outwardly from the leg openings 50ª and with the rear legs 50 positioned inwardly of the openings 49ª. In this position, the grill 46 will be disposed in upwardly spaced relation to the top of the flange 29. Articles of food may be placed directly on the grill 46 or if desired, the pan or receptacle 52 may be placed on top of the grill and articles of food placed in the pan 52.

Other pans or dishes may be placed on top of the grill 46 in place of the large pan 52. The grill 46 may be reverted so that it will assume the position shown in Figure 11 wherein the frame 47 rests on the seats 32. In this position, the legs 49 and 50 may support the pan 52 by disposing the lower edge of the pan 52 on the seats 51 of the legs 49 and 50. It will also be understood that the grill 46 may be removed and the pan 52 lowered and disposed on the lug seats 32.

Figure 3:
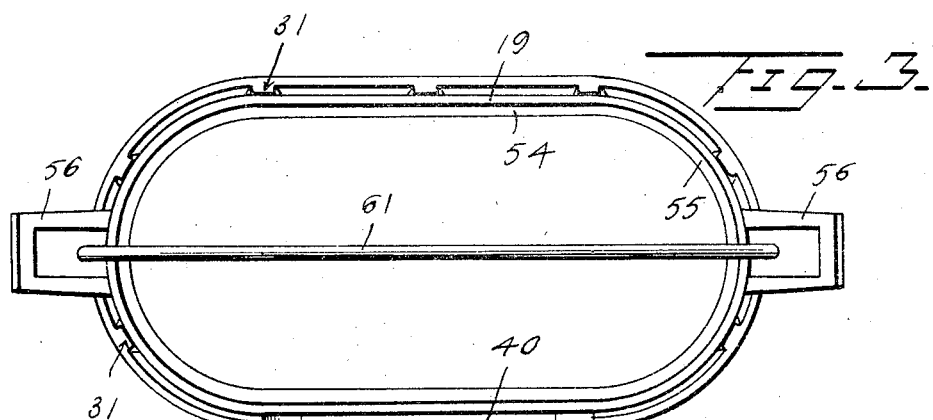
Figure 3 is a detail top plan of the device.

During the use of the stove, the bail 61 may be removed from the coupling pins 58 by pushing the bail 61 downwardly and then spreading the open lower ends so that the eyes 60 may be disengaged from the heads 59. The bail 61 is designed primarily for the purpose of transporting the assembly which may be retained in the form shown in Figures 1, 4 and 5. In the assembled form, the bail 61 projects downwardly through the looped handles 56 as shown in Figures 1, 3 and 4. The stove hereinbefore described may be constructed out of cast metal which will provide a very substantial stove structure and may be made in any desired size which may be easily transported.

What we claim is:

1. In a portable stove having an open top hollow body; the combination of a flared rim carried by the upper edge of said body and provided with openings therethrough, a substantially elliptical grill, supporting lugs for said grill carried by said rim, a pair of front legs carried by said grill, a pair of rear legs carried by said grill spaced apart a distance different from said front grill legs, said rim having openings through which said legs may extend in one position of said grill to thereby position said grill on said lugs, said leg openings and said grill legs being so disposed that in a reversed position of said grill said grill legs will be disposed out of registry with said leg openings and the lower ends of said grill legs will rest on said rim.

2. In a portable stove having an open top hollow body; the combination of a flared rim carried by the upper edge of said body and provided with openings therethrough, a grill, supporting lugs for said grill carried by said rim, a spaced apart pair of front legs carried by said grill, a spaced apart pair of rear legs carried by said grill, said pairs of legs being spaced apart different distances, the rear of said rim having a pair of openings spaced apart to receive said front legs therethrough and the front of said rim having a pair of openings spaced apart to receive said rear legs therethrough, said pairs of legs extending through said openings when said grill is one position with said grill resting on said lugs, said leg openings and said grill legs being so disposed that in a reversed position of said grill said grill legs are disposed out of registry with said leg openings and the lower ends of said grill legs rest on said rim.

3. In a portable stove having an open hollow body; the combination of an outwardly and upwardly flared rim formed integrally with the upper edge of said hollow body and provided with openings therethrough, a grill substantially longer and wider than said hollow body, supporting lugs for said grill carried by said rim, a spaced apart pair of front legs carried by said grill, a spaced apart pair of rear legs carried by said grill, said pairs of legs being spaced apart different distances, the rear of said rim having a pair of openings spaced apart to receive said front legs therethrough and the front of said rim having a pair of openings spaced apart to receive said rear legs therethrough, said pairs of legs extending through said openings when said grill is one position with said grill resting on said lugs, said leg openings and said grill legs being so disposed that in a reversed position of said grill said grill legs are disposed out of registry with said leg openings and the lower ends of said grill legs rest on said rim.

BOLLING JONES, Jr.
ROBERT H. WHITE.
LYNT WHITE.